Oct. 2, 1951         J. M. PESTARINI         2,570,005

DIRECT-CURRENT DYNAMOELECTRIC MACHINES IN PARALLEL

Filed Oct. 7, 1946         3 Sheets-Sheet 1

INVENTOR
Joseph Maximus Pestarini
BY George H. Corey
ATTORNEY

Oct. 2, 1951 J. M. PESTARINI 2,570,005
DIRECT-CURRENT DYNAMOELECTRIC MACHINES IN PARALLEL
Filed Oct. 7, 1946 3 Sheets-Sheet 2

INVENTOR
Joseph Maximus Pestarini
BY
George H. Carey
ATTORNEY

Oct. 2, 1951    J. M. PESTARINI    2,570,005
DIRECT-CURRENT DYNAMOELECTRIC MACHINES IN PARALLEL
Filed Oct. 7, 1946    3 Sheets-Sheet 3

INVENTOR
Joseph Maximus Pestarini
BY
George H. Corey
ATTORNEY

Patented Oct. 2, 1951

2,570,005

UNITED STATES PATENT OFFICE 2,570,005

DIRECT-CURRENT DYNAMOELECTRIC MACHINES IN PARALLEL

Joseph Maximus Pestarini, Staten Island, N. Y.

Application October 7, 1946, Serial No. 701,794

21 Claims. (Cl. 322—92)

This invention relates to dynamo electric machines utilizing or generating direct current. The invention more especially relates to a direct current dynamo electric machine or a plurality of such machines having in themselves or together providing a plurality of dynamo electric elements connected in parallel.

The invention particularly relates to multipolar direct current dynamo electric machines, that is direct current generators or motors which are constructed with a plurality of sets of north and south poles and which therefore operate in a plurality of cycles in each revolution of the armature of such machines. As the direct current dynamo electric machine fundamentally is an alternating current machine in which, by means of a commutator and brushes, a current is caused to flow uni-directionally from one brush through the outside circuit and return to the other, the elemental cycle takes place when an armature conductor passes successively and alternately past a north and a south pole. In conventional multi-polar, that is, multi-cycle direct current machines the north and south poles are arranged alternately about the axis of the armature, ordinarily in uniformly spaced relation to each other. The brushes in contact with the commutator also are arranged about the axis of the armature ordinarily in uniformly spaced relation and between the axes of the north and south poles. In conventional multi-cycle direct current generators and motors alternate brushes are connected together so that the current flows in parallel thereto or therefrom to reach or to be received from the leads connected to the outside circuit. The connection between the brushes which are like positioned with respect to the north and south poles constitutes a ring by virtue of which all of the like positioned brushes are maintained at substantially the same potential.

It is well known that in such dynamo electric machines circulating currents flow between the brushes through the rings, these currents being generated because of differences in the magnetic circuit due to differences in the construction of field poles, differences in the magnetic permeability of the pole pieces and of the armature, variations in the air gap and in the resistances in the windings of the fields as well as of the armature winding through which currents pass to and from the brushes flow and for other reasons. Differences in potential are set up in the conductors of the armature such that currents of substantial strength may flow through the windings and rings with consequent heating of the machine and loss of efficiency.

In the operation of a plurality of dynamo electric machines in parallel it is necessary also to connect together the positive terminals of the several machines, on the one hand, and to connect together the negative terminals of these machines on the other hand. When a plurality of single cycle machines are connected in parallel circulating currents flow through the cross connections between the machines. When two or more multi-cycle machines are connected in parallel the respective positive and negative brush connecting rings in the different machines are connected together. In addition to the circulating currents which may flow in the individual multi-cycle machines, circulating currents also may flow through the cross connections between such machines connected in parallel. These circulating currents also produce loss and heating of the machines with consequent reduction in their efficiency.

It is an object of the invention to provide a dynamo electric machine of multi-polar or multi-cycle type in which the generation of circulating currents is counteracted.

It is another object of the invention to provide a dynamo electric machine in which the difference in potential developed by the operation of the machine which creates the circulating current is opposed by a difference of potential also devolped by the machine which reduces or completely offsets the potential creating the flow of circulating current so that these circulating currents are minimized or eliminated.

It is a further object of the invention to provide a system of connecting a plurality of dynamo electric machines in parallel so that circulating currents generated therein and flowing therebetween are counteracted and reduced to a minimum or eliminated.

Another object of the invention is to provide means for controlling the apparatus of the invention so as to secure the requisite opposing electromotive force to reduce or fully counteract the generated potential differences creating the circulating currents.

The invention utilizes principles discovered by me and disclosed in my various United States and foreign patents and in the publication Revue Generale de l'Electricite of March 8 and 15, 1930; August 16 and 23, 1930; November 22 and 29, 1930; and December 6, 1930, describing metadyne dynamo electric apparatus. As in a conventional single cycle direct current motor or generator, a single cycle metadyne element is provided with a pair of main or primary brushes in contact with the commutator and connected to the terminals of the machine for receiving or for delivering the electrical current. In a single cycle metadyne element also at least one and preferably at least two auxiliary brushes are provided. Such auxiliary brushes are respectively interplaced between the primary brushes and preferably at 90 electrical degrees therefrom. In metadynes as heretofore utilized the interplaced auxiliary brushes other than the primary brushes have been connected in different ways to exterior circuits for various purposes, such as supplying a motor or other load or for receiving current from a generator or other supply as disclosed in my prior patents. These auxiliary brushes so connected to an exterior circuit have been referred to as the secondary brushes.

It is an important feature of the present invention that in dynamo electric machines having a plurality of sets of poles, that is operating in a plurality of cycles in each revolution of the armature and which therefore require the connection of all of the positive brushes in parallel by a ring connection and corresponding connection of all of the negative brushes in parallel a plurality of pairs of auxiliary brushes is used, the brushes of each pair respectively being positioned between the primary brushes and preferably displaced 90 electrical degrees from the primary brushes. In this respect the location of the auxiliary brushes is similar to that of the conventional metadyne. In a manner similar to the ring connection of the positive and of the negative brushes in the conventional dynamo to secure the parallel connection thereof to the terminals of the machine, all of the like positioned or homologous auxiliary brushes of the dynamo of the invention are connected by a bus ring, two such bus rings being necessary to provide for connection of the auxiliary brushes of the two groups which preferably are positioned 180 electrical degrees from each other. For reasons more fully explained hereafter the provision, on the one hand, of the conventional connector rings connecting respectively the positive primary brushes and the negative primary brushes of the machine and, on the other hand, of the bus rings connecting respectively the homologous auxiliary brushes is effective to reduce or eliminate cross currents ordinarily flowing through the brush connecting rings, the brushes and the armature winding of the conventional machine.

An important second feature of the invention concerns the connection of a plurality of dynamo electric machines in parallel, whether these machines be single cycle or multi-cycle, in order to prevent or minimize the flow of circulating currents between the machines. For this purpose auxiliary brushes also are utilized for each machine, these brushes being located preferably 90 electrical degrees displaced from and between the primary brushes. Homologous auxiliary brushes of the several machines are connected together in parallel by cross conductors, two such cross conductors running between the machines of the group of machines connected in parallel in addition to the usual cross leads for parallel connection. Where each of the machines itself is a multi-cycle machine and, therefore, is provided with a plurality of pairs of primary brushes and corresponding connector rings a plurality of pairs of auxiliary brushes respectively interplaced between the primary brushes are provided for each of the machines, the homologous brushes of the pairs of auxiliary brushes in each machine being connected by respective bus rings in the manner described above. The positive and negative primary brushes in each machine, respectively being connected together by rings in the conventional manner, also are connected in parallel to the corresponding primary brushes and the connecting rings of the other machines to constitute the parallel connection of the machines to the circuit terminals.

In a similar manner in accordance with the second feature of the invention the homologous auxiliary brushes which in each machine are connected together by a bus ring are connected by cross conductors in parallel to the corresponding homologous auxiliary brushes of the other machines and to their bus rings. There is, however, in accordance with the invention no other external connection from or to these auxiliary brushes or their bus rings and cross conductors, either in a multi-cycle machine or in a system in which a plurality of dynamo electric machines either of single cycle or multi-cycle type are connected together in parallel. The inter-connection of the auxiliary brushes between parallelly connected direct current dynamo electric machines may be effected in the manner more particularly described hereafter to prevent or minimize as well as to control the flow of circulating currents both in the armature windings of each machine and between the machines.

In accordance with the principle of the metadyne, in a single element metadyne, for example, the current flowing from one primary brush to the other through the armature generates a flux which may be called the primary flux the axis of which is substantially in line with the primary brushes. When the armature is rotated in the field of this flux no substantial potential difference is developed between the primary brushes due to this flux. By virtue of such rotation of the armature winding in the field of this primary flux a substantial potential difference, however, is developed between auxiliary brushes located in positions displaced 90 electrical degrees respectively from the primary brushes. This potential difference developed between the auxiliary brushes itself is effective to generate an auxiliary flux in line with the auxiliary brushes if current is permitted to flow from one auxiliary brush to the other through the armature winding and to return through a short circuit connection between the auxiliary brushes or through an outside load. When such auxiliary flux is generated the armature winding operating in the field of this auxiliary flux will develop a difference of potential between the primary brushes in opposition to the potential difference applied at these primary brushes. The resultant potential difference between the primary brushes is that which produces the normal flow of current through the armature having regard to the resistance thereof. When the homologous or like positioned auxiliary brushes in each multi-cycle dynamo electric machine of the invention as above generally described, are connected together by bus rings and when two or more such dynamo electric machines are connected in parallel, I have discovered that I may utilize this characteristic action of the metadyne to oppose the flow of circulating currents in the armature of the machine and in its conventional connecting rings as well as the circulating currents which may flow between the parallelly connected machines, thus to minimize or prevent the flow of such circulating currents.

The invention will be more clearly understood from the description of the drawings to follow in which.

Figure 1:
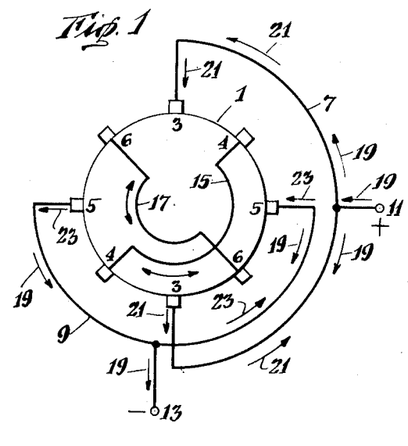
Fig. 1 shows diagrammatically a multi-cycle direct current dynamo electric machine embodying the invention.

In Fig. 1 is shown diagrammatically an armature of a multi-cycle dynamo electric machine having two pairs of primary brushes 3 and 5 spaced uniformly about the circumference of the commutator of such armature. Interspaced between these primary brushes are two pairs of auxiliary brushes 4 and 6. The positive primary brushes 3 are connected by connector ring 7 and the negative primary brushes 5 are connected by connector ring 9 in the conventional manner, these rings respectively being connected to the terminals 11 and 13 of the machine. In accordance with the invention homologous auxiliary brushes 4 are connected by a bus ring 15 and the homologous auxiliary brushes 6 are connected by a bus ring 17, so that normally the two brushes 4, 4 are at the same potential and the two brushes 6, 6 are at the same potential. No other connections to the brushes 4 and 6 and their respective bus rings 15 and 17 are required to secure the results and performance afforded by the invention.

In accordance with the principle of the metadyne current passing as shown by arrows 19 from the terminal 11 through the connector ring 7, through brushes 3, 3 to the armature and leaving the armature at the brushes 5, 5 to flow through the connector ring 9 to the terminal 13 produces a difference of potential of the two brushes 4, 4 relative to two brushes 6, 6. When no circulating current flows through the connecting ring 7 between one of the homologous primary brushes 3 and the other primary brush 3 or through the connector ring 9 and the armature between one of the homologous primary brushes 5 and the other primary brush 5 the condition that there is no difference of potential of one of the two auxiliary brushes 4, 4 with respect to the other or of one of the two auxiliary brushes 6, 6 with respect to the other is maintained and no current flows in the bus rings 15 and 17 respectively connecting the brushes 4, 4 and 6, 6. It can be demonstrated, however, that, as soon as a circulating current flows between brushes 3, 3, for example, as shown by the arrow 21, or between brushes 5, 5 as shown by arrow 23, or flows in the other directions in these connector rings and brushes, potential difference is developed between the homologous auxiliary brushes 4, 4 and between the homologous auxiliary brushes 6, 6 or both between the brushes 4, 4 and between the brushes 6, 6 and currents therefore flow in the bus rings 15 and 17 respectively in directions depending upon the direction of flow of the circulating currents in the rings 7 and 9. It can be shown that these currents flowing through the bus rings 15 and 17 and through the brushes which they connect and through the armature in turn develop a difference of potential between the homologous primary brushes 3, 3 and between the homologous primary brushes 5, 5 which in each case is a direction to oppose the circulating current flowing through the connector rings 7 or 9 as the case may be. The larger the circulating current is which flows in one or the other of the connecting rings 7 or 9 and through the brushes to which such ring is connected the greater will be the value of the potential difference developed to oppose the flow of such circulating current. Thus, by means of the bus rings connecting the auxiliary brushes as shown the circulating current may be completely eliminated or may be reduced to such a value that there is no practial interference with the efficient operation of the machine.

Figure 2:
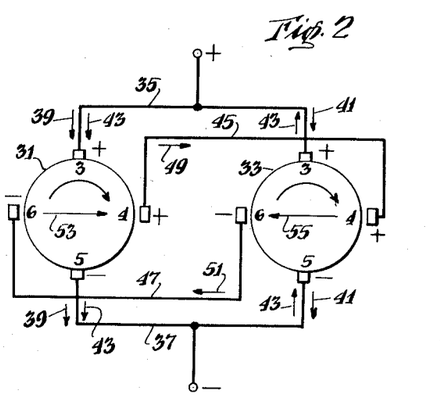
Fig. 2 shows diagrammatically an arrangement of two single cycle dynamo electric machines connected in parallel and embodying the invention.

In Fig. 2 are shown two dynamo electric machines 31 and 33 assumed for simplicity to be substantially of the same capacity and characteristics and each having primary brushes 3 and 5. These machines are connected in parallel, the positive primary brushes 3 in the two machines being connected in conventional manner by the cross lead 35, the negative primary brushes 5 being connected together by the cross lead 37. The cross leads 35 and 37 are connected respectively to the positive and negative terminals of the machine in the conventional manner. Current flows in the direction of the arrows 39 and 41 respectively through the armatures of the two machines between the brushes 3 and 5 thereof. In accordance with the principles of the metadyne this current will develop a potential difference between auxiliary brushes 4 and 6 in each of the machines 31 and 32. If the machines 31 and 33 are rotating in the same direction, for example, clockwise, as shown in Fig. 2, this difference in potential may be such that the auxiliary brushes 4 are positive and the auxiliary brushes 6 are negative. With machines of identical construction and electrical characteristics, in principle the current 39 will be equal to the current 41 if the load on the two machines 31 and 33 is equally divided between the machines. Thus, the potential differences between the auxiliary brushes 4 and 6 in the respective machines will be the same. Because of the unavoidable differences, however, in the construction of the two machines in practice circulating currents will tend to flow through the cross leads 35 and 37 and through the armatures of machines 31 and 33 as above referred to. If, for example, the circulating current tends to flow in the direction of the arrows 43 in Fig. 2, this current will tend to increase the current flowing through the armature of machine 31 between brushes 3 and 5 and will tend to reduce the current flowing through the armature between the brushes 3 and 5 of machine 33, thus to unbalance the operation of the two machines connected in parallel as well as to cause undue heating and loss of efficiency.

In accordance with the principles of the metadyne such increase of current flowing between the brushes 3 and 5 of machine 31 will cause the potential between the auxiliary brushes 4 and 6 of this machine to increase. Correspondingly, in machine 33 the reduction of the current flowing between brushes 3 and 5 of this machine will effect a reduction in the potential difference between the brushes 4 and 6 of machine 33. If, now, in accordance with the invention the homologous auxiliary brushes 4 are connected by the cross conductor 45 and, correspondingly, the homologous brushes 6 are connected by a cross conductor 47, current will flow through the lead 45 in the direction of the arrow 49 because of the increase in the potential of the auxiliary brushes 4 of machine 31 relative to the brush 6 of this machine and the decrease of the potential of the auxiliary brush 4 of machine 33 relative to the brush 6 of this machine. This current will return through the conductor 47 in the direction of the arrow 51.

In the armature of machine 31 this current 51, 49 flowing in the direction indicated will produce a flux as shown by the arrow 53 in Fig. 2 having its axis in the line of the auxiliary brushes 6 and 4 of machine 31. This flux 53 will generate a difference in potential between the brushes 5 and 3 opposed to the applied difference of potential at these brushes and thus will tend to cause a counter current in opposition to the circulating current 43 flowing into the armature through the brush 3. Reduction of the circulating current flowing through the armature between the brushes 3 and 5 reduces the potential between the auxiliary brushes 4 and 6 of machine 31 due to this circulating current, thus to reduce the current 49 flowing through the cross conductor 45 in the direction of the arrow 49. Correspondingly, the circulating current 49 flowing through the armature of machine 33 between brushes 4 and 6 of this machine will generate a flux in the direction of the arrow 55. This flux 55 will develop a difference in potential in the same direction as the applied potential between the primary brushes 3 and 5 of this machine with a corresponding increase in the current flowing through the armature between the brushes 3 and 5, thus opposing the flow of the circulating current 43 through the armature 33 in the direction of the arrows as shown in Fig. 2. It will be understood, therefore, that a circulating current tending to increase the normal current flowing into the armature of one machine and flowing from the armature of the other machine at the corresponding primary brush in opposition to the normal current of this other machine will be opposed or fully counteracted by virtue of the provision of the auxiliary brushes 4 and 6 in each machine, homologous auxiliary brushes being connected by the cross conductors therebetween and without other external connections so as to insure that the currents which flow in these auxiliary cross conductors are effective in the respective armatures to produce fluxes and corresponding opposing electromotive forces to counteract the flow of the circulating currents.

Figure 3:
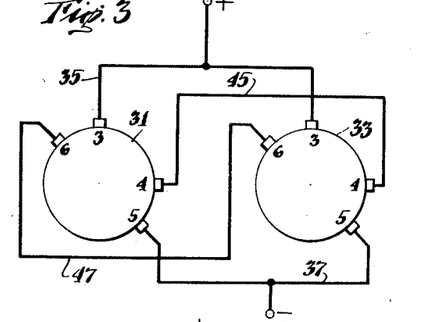
Fig. 3 shows a modification of the arrangement of Fig. 2.

In Fig. 3 is shown a modification of a system of the invention in which two dynamo electric machines 31 and 33 are connected in parallel, the homologous primary brushes 3 of the two machines being connected in the conventional manner by a cross lead 35, the homologous primary brushes 5 of the two machines being connected by a cross lead 37. Instead, however, of the auxiliary brushes 4 and 6 being diametrically oppositely disposed with respect to each other in the two machines 31 and 33 and both mechanically displaced with respect to the primary brushes 3 and 5 at 90 degrees therefrom about the commutator, as in the embodiment of Fig. 2, the auxiliary brushes 6 in Fig. 3 are disposed in positions less than 90 degrees from the primary brushes 3 of the respective machines. Although the brushes 4 are shown in the diagram of Fig. 3 at 90 degrees from the brushes 3 they are positioned at less than 90 degrees from the brushes 5. The brushes 6 also are displaced from the primary brushes 5 at an angle greater than 90 degrees. Within the scope of the invention, however, the mechanical relation of the brushes as shown in Fig. 3, may correspond to displacements of the brushes 4 and 6 respectively at 90 electrical degrees or at other angles of electrical degrees from the brushes 3 and 5 for various purposes.

The brushes 4 of the two machines are connected by the cross conductor 45 and the brushes 6 in the two machines are connected by cross conductor 47 the same respectivity as in Fig. 2. The arrangement diagrammatically shown in Fig. 3 represents, therefore, a general arrangement as to the positions which may be occupied by the auxiliary brushes within the scope of the invention. In each case homologous auxiliary brushes are connected together in the several machines of a plurality of machines connected in parallel. The potential differences developed in the two machines in general in accordance with the principle of the metadyne are effective in the general system represented by Fig. 3 to counteract or neutralize the circulating currents in the manner described in connection with Fig. 2 in parallelly connected dynamo electric machines, these potentials tending to set up counter currents through the cross leads 35 and 37 and the cross conductors 45 and 47.

Figure 4:
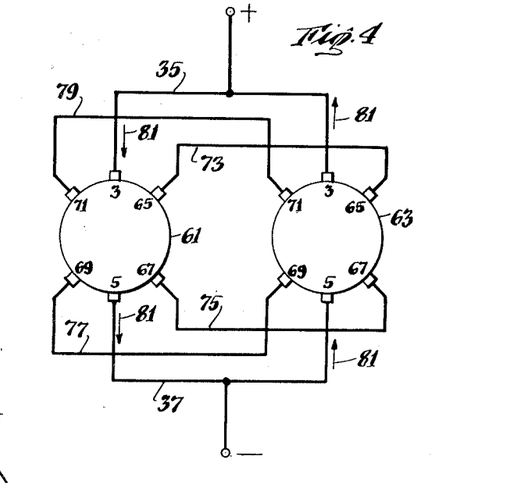
Fig. 4 shows another modification of the arrangement of Fig. 2.

In Fig. 4 two dynamo electric machines 61 and 63 are shown connected in parallel, the primary brushes 3 of these machines being connected by cross lead 35, the primary brushes 5 of these machines being connected by cross lead 37 in the manner similar to that shown in Figs. 2 and 3. In the embodiment of Fig. 4, however, between the primary brush 3 and the primary brush 5 in each machine two auxiliary brushes are positioned at either side of the line joining the brush 3 with the brush 5 in the respective machines. The brushes 65 and 67 are shown in the diagram of Fig. 4 at the right hand of the vertical axis and the brushes 69 and 71 are shown at the left hand of the vertical axis in each machine. In order to carry out the connection of the homologous auxiliary brushes 65, 67, 69 and 71 in the two machines four cross conductors 73, 75, 77 and 79 are required. Cross conductor 73 connects the homologous brushes 65 in the two machines. Cross conductor 75 connects the homologous brushes 67 in the two machines. Similarly the cross conductors 77 and 79 respectively connect with the homologous brushes 69 and the homologous brushes 71. It may be demonstrated for the arrangement shown in Fig. 4 that a circulating current flowing through the cross conductors 35 and 37 and entering the brush, for example, the brush 3 of the machine 61 and leaving the machine 63 at the brush 3, this circulating current flowing in the direction of the arrows 81, will produce potentials at the auxiliary brushes 65, 67, 69 and 71 in the two machines such that the potential differences are generated in a manner corresponding to that described in connection with Fig. 2 with respect to the brushes 4 and 6. These potential differences will be effective in a manner similar to that described for the currents flowing through the cross conductors 45 and 47 of Fig. 2 to establish flow through cross conductors 73, 75, 77 and 79 in directions which will counteract the flow of the circulating current through the cross leads 35 and 37, thus to reduce or to neutralize these circulating currents. The direction of the electromotive force and, therefore, of the current which it produces is always such in the system of the invention that it produces a current counter to the circulating current in whichever direction this circulating current tends to flow through the cross leads.

Figure 5:
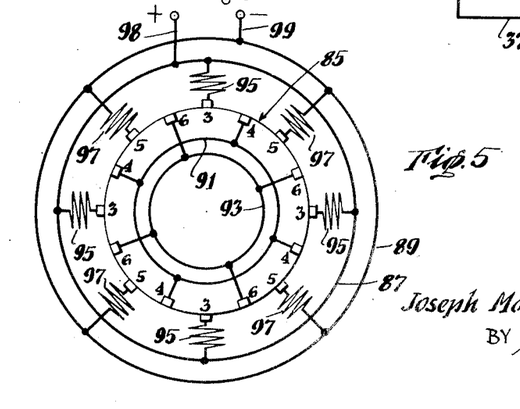
Fig. 5 shows a multi-cycle dynamo electric machine embodying the invention and utilizing commutating windings associated with the brushes of the machine.

In Fig. 5 is schematically shown a dynamo electric machine having an armature 85 and a set of four positive primary brushes 3 and a corresponding set of four negative primary brushes 5 positioned, in the particular embodiment shown, uniformly spaced about the circumference of the commutator of the armature 85. The diagram of Fig. 5 as thus far explained substantially is that of a conventional four pole dynamo electric machine, the brushes 3 and 5 of which may be assumed to be positioned in the conventional manner between the axes of the field poles of the machine. As in the conventional multipole or multi-cyclic dynamo electric machine, the machine diagrammatically represented in Fig. 5 is provided with a connector ring 87 connecting all of the primary brushes 3 and a connector ring 89 connecting all of the primary brushes 3 and a connector ring 89 connecting all of the primary brushes 5. In accordance with the general principles described in connection with Fig. 1 the dynamo electric machine of Fig. 5 is provided with a pair of bus rings 91 and 93 respectively connecting the auxiliary brushes 4 and the auxiliary brushes 6 which respectively are interplaced between the brushes 3 and 5. For the reasons which have generally been set forth in connection with Fig. 1 these bus rings will be effective in cooperation with the auxiliary brushes 4 and 6 in contact with the commutator with which the primary brushes 3 and 5 make contact to counteract or neutralize circulating currents flowing in the connector rings 87 and 89 and through brushes 3 and 5 and the armature 35.

In order to assist commutation and to minimize or avoid sparking commutating poles and commutating windings therefor as shown diagrammatically in Fig. 5 at the commutating points at which the brushes ordinarily are placed in the conventional manner. Such commutating windings ordinarily have been connected to the terminals of the machine in such a way that alternate windings are connected in series in each terminal lead to the respective connector rings to which the positive and negative brushes of the machine respectively are connected. Such series connection has been necessary because, as is well known, circulating currents developed in the operation of the machine are erratic and may at some times flow in one direction and sometimes flow in the other in the connector rings and in the brushes connected thereto. Since it is necessary to maintain a unidirectional current through the windings of the commutating poles in order to maintain the effect of these poles on the commutation, it has heretofore been impossible to utilize the current flowing through the respective primary brushes of a machine to secure the effect of a commutating pole traversed only by the current flowing through the brush with which the given commutation pole is associated.

Because of the reduction or the neutralization of the flow of circulating currents in the connecting rings of the dynamo electric machine of the invention it becomes possible to utilize commutating windings and poles which are traversed by the current flowing through the brushes with which respectively these commutating poles are associated. Thus, in the embodiment of Fig. 5, in series with each of the primary brushes 3 and between such brush and the connector ring 87 a commutating winding 95 is connected. Similarly between each brush 5 and the connector ring 89 commutating windings 97 are connected. Since the circulating currents are neutralized by virtue of the bus rings and auxiliary brushes the currents flowing through the brushes 3 are always in the same direction with respect to the ring 87 and similarly the currents flowing through the brushes 5 are always in the same direction with respect to the rings 89, these rings being respectively connected to the positive and negative terminals of the machine in the embodiment of Fig. 5. It thus will be apparent that the commutating windings 95 and 97 are traversed by respective fractions or portions of the current which flows in the terminal leads 98 and 99. Ordinarily in the machine of the invention substantially equal portions of the current which flows through the terminal leads will pass through the respective commutating windings. It is, therefore, not necessary to utilize the total current flowing through these terminal leads to energize the commutating poles. Moreover, since the amount of the current flowing through the commutating windings 95 and 97 is ony a fraction of the total current in the terminal leads, the size of the wires of the commutator windings is very much less than that of conventional windings of commutating poles with a corresponding reduction in cost and in the loss of energy due to flow of the current through these commutating poles.

Figure 6:
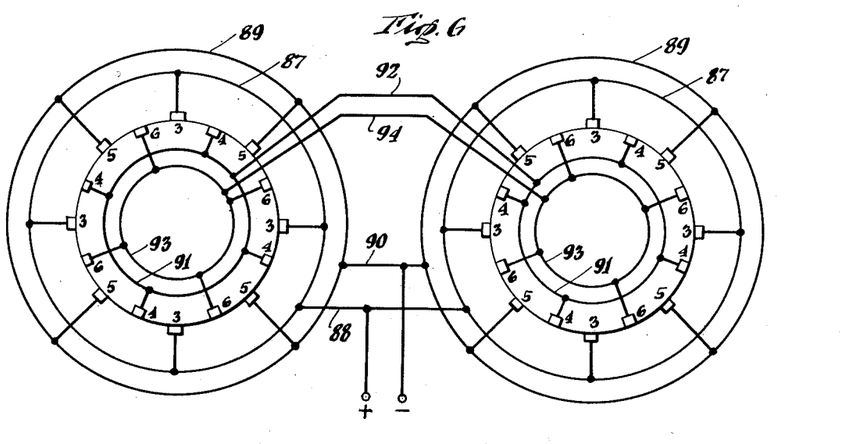
Fig. 6 shows a plurality of multi-cycle dynamo electric machines connected in parallel in accordance with the invention.

In Fig. 6 two multi-cycle dynamo electric machines are diagrammatically represented connected in parallel. Each of these machines is similar to the machine represented in Fig. 5 the commutating poles, however, being omitted for the sake of simplicity. The primary brushes 3 in each machine are connected by connector rings 87, these connector rings 87 in the two machines being connected in parallel by cross lead 88 to the positive terminal of the system. The primary brushes 5 in each machine are connected by the second connector ring 89, these connector rings 89 in the two machines being connected in parallel to the negative terminal by cross lead 90. In a manner similar to that shown in Fig. 5 the interplaced homologous primary brushes 4 and 6 respectively are connected by bus rings 91 and 93.

In the system of Fig. 6, in a manner corresponding to that shown in Fig. 2, in order to provide the cross connections to counteract or neutralize the circulating currents the bus rings 91 of the two machines are connected by cross conductor 92. Correspondingly the bus rings 93 in the two machines are connected by cross conductor 94. Any circulating current tending to flow through the cross leads 88 and 90 between the two machines is counteracted by virtue of the potential differences set up in the respective machines which create the flow of current through the cross conductors 92 and 94 in a direction such as to be counter to the flow of circulating current through the cross leads 88 and 90.

Although in Fig. 6 only two machines are shown connected in parallel in the conventional manner with cross leads connected between corresponding positive and negative connector rings 87 and 89 and with the bus rings 91 and 93 connected by cross conductors 92 and 94, within the scope of the invention a plurality of more than two such machines may be connected in parallel in the conventional manner with respect to the connector rings 87 and 89, the cross conductors 92 and 94 being extended respectively to be connected in parallel to the corresponding bus rings 91 and 93 of the additional machine or machines.

Figure 7:
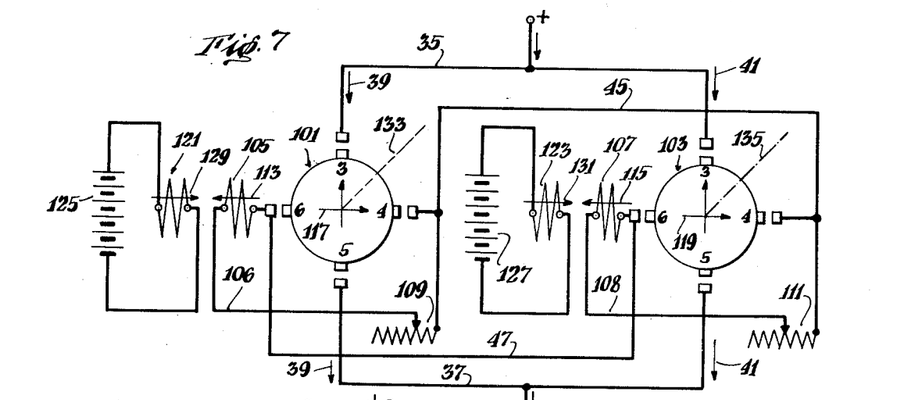
Fig. 7 shows a plurality of dynamo electric machines connected in parallel according to the invention and including variator windings for modulating the currents of the respective machines.

In Fig. 7 two dynamo electric machines 101 and 103 of the metadyne type are shown connected in parallel and provided with cross leads 35 and 37 connecting respectively between the primary brushes 3 and the primary brushes 5 in the manner as explained in connection with Fig. 2. Correspondingly, the auxiliary brushes 4 are connected by cross conductor 45 and the auxiliary brushes 6 are connected by the cross conductor 47. In the embodiment of the system as shown in Fig. 7 the cross leads 35 and 37 and the cross conductors 45 and 47 are respectively connected to terminals shown in Fig. 7 respectively adjacent the brushes 3, 4, 5 and 6. Between these terminals and the respective adjacent brushes windings, not shown in order to avoid complicating the drawing, may be inserted in series with each brush. Such an inserted winding may be a series field winding of the machine, if such field winding is required for some purpose, or one which produces a flux which cooperates with the flux developed by virtue of the flow of current through the armature in various ways which have been proposed in my patents and publications. The commutating pole windings above described in connection with Fig. 5 may be connected between these terminals and the adjacent brushes.

Across the terminals adjacent the brushes 4 and 6 in each of the machines 101, 103 in the system shown in Fig. 7 windings 105, 107 are connected by leads 106, 108, these windings being subject to the potential difference developed in the respective machines between the auxiliary brush 4 and the auxiliary brush 6. In series with the respective windings 105, 107, variable resistances 109, 111 are connected to adjust the current flowing through the windings 105, 107 so as to provide the requisite ampere turns therein to develop fluxes 113, 115 which, in the particular embodiment illustrated in Fig. 7, respectively are opposed to the fluxes 117, 119 which have their axes in line with the brushes 4 and 6 by virtue of the currents flowing between these brushes 4 and 6 and through the armatures of the respective machines. The machines 101 and 103 also have associated therewith respectively the windings 121 and 123 which are supplied from batteries or other source of constant potential 125, 127. The windings 121 and 123, in the particular embodiment of Fig. 7, are so related to the windings 105, 107 that the fluxes of these windings in the respective machines are in opposition to each other. Thus the flux 129 opposes the flux 113, but is in the same direction as the flux 117 of the metadyne 101. The flux 131 opposes the flux 115 but is in the same direction as the flux 119. The relations of the windings 105, 107 to the metadynes 101 and 103, as well as the relations of the constant flux producing windings 121 and 123 thereto may be varied both as to the ampere turns utilized and the direction of the fluxes produced for the purpose of securing particular characteristics with respect to the relations of current, voltage, torque and other characteristics of the individual dynamo electric machine used.

In the system of Fig. 7, however, in which a plurality of such dynamo electric machines are connected in parallel with each other and provided with means for counteracting or neutralizing the circulating currents as above described, the characteristics of the machine or machines which heretofore have been secured for individual dynamo electric machines of the metadyne type by virtue of the use of windings similar to the variator windings 105, 107, 121, 123 are made available for machines connected in parallel. The reduction or the elimination of the circulating currents is accomplished without interference with the action of the variator windings to secure the desired characteristic. It will be noted in Fig. 7 that the variator windings 105 and 107 are connected in parallel across the cross conductors 45 and 47. Although only a slight difference in potential between the homologous brushes 4 and between the homologous brushes 6 is sufficient to create large currents flowing respectively through cross conductors 45 and 47, as above described in connection with Fig. 2, to counteract the flow of cross currents in the cross leads 35 and 37, substantial differences of the fluxes 113 and 115 may be developed because of differences in the mechanical construction of the two machines 101 and 103, the permeability of the cores of the windings 105 and 107, the resistances of these windings and for other reasons. Such differences may cause variations in the action of the variator windings 105 and 107 upon the fluxes 117 and 119. The cross conductors 45 and 47 which are provided in accordance with the invention to prevent circulating currents, however, also are effective to compensate for such differences in the action of the windings 105 and 107. Since the conductors 45 and 47 respectively each are of low resistance they serve to carry currents acting in the windings 105 and 107 so as to counteract, or to supplement, as the case may be, any excessive current or any deficiency thereof in these windings 105 and 107 which tends to develop unbalance between the two machines due to the effect of the fluxes 113 and 115 respectively upon the fluxes 117 and 119. This function of compensation accomplished by the cross conductors 45 and 47 is an auxiliary feature of the invention.

It is to be understood that if instead of the simple metadynes 101, 103 shown in Fig. 7 dynamo electric machines of the type described above in connection with Figs. 5 and 6 are connected in parallel, variator windings also may be used to secure the requisite or desirable characteristics with corresponding provision for counteracting or eliminating the circulating currents.

In Fig. 7 the metadynes 101, 103 are shown diagrammatically with the armature thereof carried on shafts 133, 135 which respectively may be connected to suitable prime movers if the metadynes 101, 103 are to operate as generators or may be connected to drive respectively mechanical loads if the metadynes 101, 103 are to operate as motors.

Figure 8:
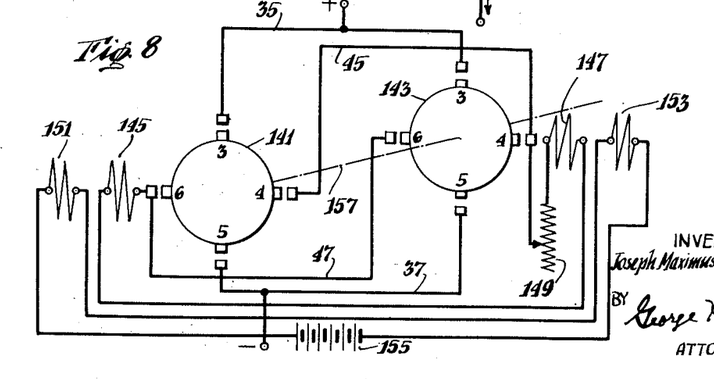
Fig. 8 shows a modification of the system of Fig. 7.

In Fig. 8 is shown a system in which two metadynes 141, 143 are connected in parallel in a manner similar to that shown in Fig. 2. In Fig. 8 as in Fig. 2, the primary brushes 3 of the two machines are connected by cross lead 35. The primary brushes 5 are connected by cross lead 37. The homologous auxiliary brushes 4 are connected by cross conductor 45 and homologous brushes 6 are connected by cross conductor 47. In the diagram of the embodiment of Fig. 8 each brush has associated therewith a terminal between which and the associated brush a winding may be connected for purposes referred to in connection with Fig. 7. In the embodiment of Fig. 8 the metadynes 141 and 143 respectively are provided with variator windings 145, 147 which may be so wound as to create a flux opposed to that produced by the flow of current through the armature and acting in line with the brushes 4 and 6 in the manner described in connection with Fig. 7. The windings 145, 147 in Fig. 8, however, are connected in series with each other and in series with a variable resistance 149. Adjustment of the resistance 149 is effective to change the current in both windings 147, 145. These two windings 145 and 147 are connected between the terminals associated with the auxiliary brushes 4 which are connected together by cross conductor 45 and the terminals associated with the auxiliary brushes 6 which are connected together by cross conductor 47. The current normally flowing through the windings 145, 147, therefore, will be that due to the normal difference in potential developed between the two brushes 4, on the one hand, and the two brushes 6, on the other hand, the brushes 4 being at the same potential and the brushes 6 being at the same potential by virtue of the low resistance cross conductors 45 and 47 respectively.

The connection of the variator windings 145 and 147 in the arrangement of Fig. 8 in series with each other, and with the adjustable resistance 149 if it is desired to adjust the action of the variator windings, reduces the currents which the cross conductors 45 and 47 may have to carry as compared with the arrangement shown in Fig. 7. Since the windings 145 and 147 are in series and, therefore, carry the same current and in the two machines 141 and 143 may be readily provided with substantially identical ampere turns or with ampere turns in a predetermined relation in the two windings, the fluxes developed by the windings 145 and 147, will be in a predetermined relation. The cross conductors 45 and 47 still perform the function described in connection with Fig. 2 of counteracting or neutralizing the circulating currents which may flow between the two machines 141 and 143. The currents which may flow between the machines in the construction of Fig. 7, however, resulting from the differences in the mechanical, electrical and magnetic characteristics with respect to the windings 145 and 147 of Fig. 7 do not become of effect in the arrangement of Fig. 8 because these windings are connected in series and not in parallel with each other.

Although in the arrangement of Fig. 8 the variator winding 147 is shown at the opposite side of machine 143 from that of variator winding 145 associated with machine 141 this opposition of position of these windings is adopted merely for convenience of representation. The windings 145 and 147 may be so wound and so positioned that the flux of the winding 145 in machine 141 opposes or acts with, as the case may be, the flux which is developed in the armature in line with the brushes 4 and 5 of the machine 141 and the flux of winding 147 in machine 143 opposes or acts with, as the case may be, the flux which is in line with the brushes 4 and 6 of the machine 143. It will be understood, however, that the fluxes produced respectively by the windings 145 and 147 act so as to oppose or to assist, as the case may be, the fluxes which are developed by the circulating currents when they tend to flow through the cross leads 35 and 37 and cross conductors 45 and 47 in the manner described in connection with Fig. 2, with the result that the circulating currents are counteracted. The extent to which the fluxes created by the windings 145 and 147 thus oppose or assist the fluxes developed by circulating currents may be varied by means of the variable resistance 149.

As shown in Fig. 8 the machines 141, 143 are provided with windings 151 and 153 which are connected in series with each other to a source of supply 155 at a substantially constant voltage. Since the windings 151 and 153 are in series and, therefore, carry the same current, the ampere turns of these windings may be readily determined so as to develop in each machine a constant flux which may be the same in both machines or in a predetermined relation one with respect to the other both as to the direction and strength thereof for the purpose of securing in cooperation with windings 145 and 147 particular characteristics in the two machines 141 and 143, these fluxes not being subject to variation between them due to differences in the applied voltage or in the resistances of the windings or for other reasons.

In the embodiment of Fig. 8 these machines are diagrammatically shown mounted upon a common shaft 157 or otherwise operatively connected together to rotate at the same speed or at speeds in a given relation one to the other.

Figure 9:
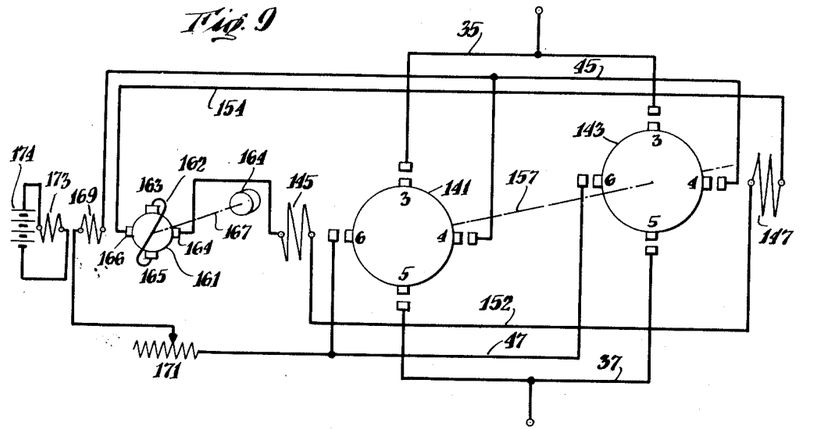
Fig. 9 shows a modification of the system of Fig. 8 utilizing an amplifier metadyne for supplying the variator windings.

In Fig. 9 an arrangement of metadyne dynamo electric machines similar to that shown in Fig. 8 is represented. The metadynes 141 and 143 are rotatable with shaft 157 and respectively are provided with variator windings 145 and 147 related to the auxiliary brushes 4 and 6 in the respective machines in the same manner as the variator windings 145 and 147 shown in Fig. 8. In Fig. 9, however, the windings 145 and 147 are connected in series by leads 152 and 154 with the auxiliary brushes 164 and 166 of an amplifier metadyne 161 having its primary brushes 163 and 165 connected by a short circuit connection in the usual manner for an amplifier metadyne. The amplifier metadyne 161 is driven by a suitable motor or prime mover 164 through shaft 167 and is excited by the winding 169 connected in series with the variable resistance 171 between the terminals associated with the brushes 4 of the two metadynes 141 and 143 and the terminals associated with the brushes 6 of these metadynes. The variation in the potential difference produced between the brushes 4 and the brushes 6 in the respective metadynes 141 and 143 because of the flow of circulating current between these two machines through the cross leads 35 and 37 is effective to vary the current flowing through the exciter winding 169 of the amplifier metadyne 161, thus to vary the potential difference between the brushes 164 and 166 and thereby to vary the current flowing through the circuit which includes the two variator windings 145 and 147 of the metadynes 141 and 143.

The amplifier metadyne 161 also is provided with a winding 173 connected to a battery 174 or other source of constant potential to develop a constant flux which in combination with the flux developed by the variator winding 169 produces a composite flux which determines the characteristic of potential difference between the brushes 164 and 166. The fluxes developed by the variator windings 145 and 147 of the metadynes 141 and 143 thereby are varied in accordance with variation in the composite flux of the amplifier metadyne and this varies with the potential difference between brushes 4 and brushes 6 of the metadynes 141 and 143. Any departure from the normal operation of the machines 141 and 143 caused by circulating currents tending to flow through the cross leads 35 and 37 will be counteracted or neutralized by virtue of the cross conductors 45 and 47 to produce the corresponding effects upon the potential difference at the brushes 4, 6 and therefore upon the amplifier metadyne which in turn modifies the action of the metadynes to restore the normal operation.

Figure 10:
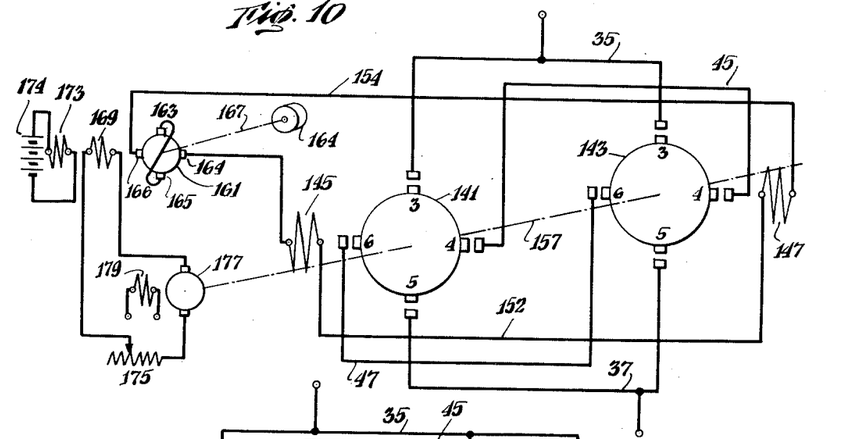
Fig. 10 shows diagrammatically an embodiment of the invention which includes means for modulating the system when the dynamo electric machines are connected to rotate together.

In Fig. 10 also is shown an arrangement of metadynes controlled as to their characteristic by means of an amplifier metadyne. Parts which in this figure are like those of Figs. 7, 8 and 9 are identified by like numerals. In the arrangement of Fig. 10, similar to that of Fig. 9, the variator windings 145 and 147 are connected in series with each other across the auxiliary brushes 164, 166 of the amplifier metadyne 161. The amplifier metadyne 161 is provided with a variator winding 169 and with a winding 173, the winding 173 being connected, as in Fig. 9, to a source 174 of constant potential difference. Instead, however, of winding 169 being connected in series with a variable resistance across the terminals 4, 4 and 6, 6, in the embodiment of Fig. 10 the winding 169 is connected in series with a variable resistance 175 across the terminals of an auxiliary generator 177 the armature of which is mounted on the same shaft 157 with the metadynes 141 and 143 or is otherwise operatively connected to rotate at the same speed or in a predetermined relation to both of these metadynes. The winding 169, therefore, may be supplied with current proportional to the speed of the auxiliary generator 177, that is, proportional to the speed of the metadynes 141 and 143. The amount of this current may be adjusted by the variable resistance 175. To determine for a given speed the voltage developed at the terminals of the generator 177, a winding 179 across constant voltage is provided.

The variator windings 145 and 147 of the metadynes 141 and 143 are supplied with current which varies with the excitation of the winding 169, that is, in relation to the speed of the auxiliary generator 177 and of the metadynes 141 and 145. The direction of the fluxes produced by the windings 145 and 147 acting in line with the brushes 4 and 6 in relation to the flux produced by the winding 169 active in line with brushes 164 and 166 may be such that if the machines 141 and 143 are operated as motors and the speed of the machines, for example, tends to increase the fluxes will modify the potential differences between brushes 3 and 5 in the respective machines so as to reduce the current flowing through brushes 3 and 5, thereby to reduce the speed of these machines. If the metadynes 141 and 143 are operating as generators, the shaft 157 being driven by a prime mover, the direction of the flux produced by the windings 145 and 147 and the relation thereof to the flux produced by winding 169 of the amplifier metadyne may be such that if the speed increases, the voltage generated between the primary brushes 3 and 5 thereby tending to increase will be reduced by the reaction of the fluxes. This action occurs because the increase of speed increases the voltage generated in the regulator dynamo 177. This increases the excitation of the amplifier metadyne and thereby modifies the current flowing through the variator windings 145 and 147 so as to decrease the excitation of the generator metadynes 141 and 143, thereby to restore the normal voltage at the brushes 3 and 5.

Figure 11:
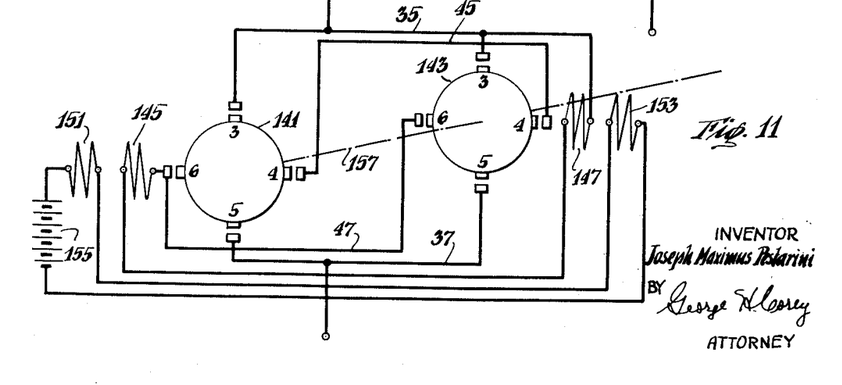
Fig. 11 shows another modification of the system of Fig. 8.

In Fig. 11 is shown an arrangement of metadynes 141 and 143 similar to that of Fig. 8, like parts in Fig. 11 having the same numerals as those in Fig. 8. In the arrangement of Fig. 11, however, it will be noted that the variator windings 145 and 147, although connected in series, are connected between the terminals associated with the brushes 6 which are connected by the cross conductor 47 and the terminals which are associated with the brushes 3 which are connected by the cross lead 35. In this arrangement the potential difference which is impressed upon the series connected windings 145, 147 is different from that supplied in the arrangement of Fig. 8 and such a modification may be utilized for the purpose of securing a peculiar characteristic in the parallel operation of the metadynes mounted upon the same shaft 157 or otherwise operatively connected together.

Other modifications of the systems and arrangements above described may be made which utilize elements functioning as do the bearings connecting homologous auxiliary brushes of a multi-cycle machine and as do the cross conductors connecting homologous auxiliary brushes in a system in which a plurality of direct current dynamo electric machines are connected in parallel. Various other applications of the variator windings may be used for modulating the currents supplied by or received by the dynamo electric machine constructed and arranged in accordance with the invention. Although the commutating windings have been described only in connection with the primary brushes and the connector rings connecting these primary brushes, such commutating windings wound on suitable pole pieces may be used in some cases, especially in large machines, to facilitate the commutation at the auxiliary brushes. The commutating windings so functioning may be connected between the auxiliary brushes and the respective bus rings to carry the currents which flow as above described in opposition to the undesirable circulating currents. All such variations and modifications are intended to be within the scope of the appended claims.

I claim:

1. In a multicycle direct current dynamo electric machine having an armature and a commutator and a plurality of pairs of primary commutating brushes respectively connected by ring connectors, the combination therewith of a plurality of pairs of auxiliary brushes interplaced respectively between the pairs of primary brushes in relation to the commutator, and cross conductors connecting each brush of one pair of auxiliary brushes to the homologous brushes only in the other pairs of auxiliary brushes.

2. In a system for operation of a plurality of direct current dynamo electric machines connected in parallel, said machines each having an armature and a commutator and at least one pair of primary commutating brushes for connection to an external circuit, each machine having at least one pair of auxiliary brushes and interplaced between the primary brushes about the commutators of said machine, and cross conductors connecting an auxiliary brush of each machine with the homologous auxiliary brushes on the other machines.

3. In a system for operation of a plurality of direct current dynamo electric machines connected in parallel, said machines each having an armature, a commutator, a plurality of pairs of primary commutating brushes respectively connected by ring connectors, and cross leads connecting together respectively the positive brushes of the several machines and the negative brushes of the several machines, the combination therewith of a plurality of pairs of auxiliary brushes associated with each dynamo electric machine and interplaced respectively between the brushes of the pairs of primary brushes about the commutators of the respective machines, a pair of bus rings associated with each dynamo electric machine, each ring connecting the homologous auxiliary brushes only of said machine, and cross conductors connecting the interconnected auxiliary brushes of one machine with the homologous interconnected auxiliary brushes of the other machines.

4. In a system for operation of a plurality of direct current dynamo electric machines connected in parallel, the combination as defined in claim 2 which comprises a variator winding associated with each dynamo electric machine and positioned with its effectve magnetic axis substantially in line with the axis of the flux generated by flow of current between said auxiliary brushes through the armature of said machine, said variator windings being connected across the brushes of a pair of auxiliary brushes of the respective machines.

5. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by flow of current between said auxiliary brushes through the armature of said machine, said variator windings being connected in series with each other between the two groups of homologous auxiliary brushes of said dynamo electric machines which respectively are connected by said cross conductors.

6. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by flow of current between said auxiliary brushes through the armature of said machine, said variator windings being connected in series with each other between the two groups of homologous auxiliary brushes of said dynamo electric machines which respectively are connected by said cross conductors, and a variable resistance connected in series with said variator windings.

7. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by flow of current between said auxiliary brushes through the armature of said machine, said variator windings being connected in series with each other and in series with the auxiliary brushes of an amplifier metadyne, said amplifier metadyne having a variator winding connected between the two groups of homologous auxiliary brushes of said dynamo electric machines which respectively are connected by said cross conductors.

8. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by flow of current between said auxiliary brushes through the armature of said machine, said variator windings being connected in series with each other and in series with the auxiliary brushes of an amplifier metadyne, said dynamo electric machines being operatively connected together to rotate in a constant speed relation to each other, a direct current generator operatively connected to said dynamo electric machines to rotate in a constant speed relation thereto, said amplifier metadyne having a variator winding connected to said direct current generator so as to be energized thereby.

9. In a system for operation of a plurality of direct current dynamo electric machines connected in parallel, the combination as defined in claim 2 which comprises a variator winding associated with each dynamo electric machine and positioned with its effective magnetic axis substantially in line with the axis of and adapted to oppose the flux generated by the flow of current between said auxiliary brushes through the armature of said machine, said variator windings being connected across the brushes of a pair of auxiliary brushes of the respective machines.

10. In a system for operation of a plurality of direct current dynamo electric machines connected in parallel, the combination as defined in claim 2 which comprises a variator winding associated with each dynamo electric machine and positioned with its effective magnetic axis substantially in line with the axis of and adapted to oppose the flux generated by the flow of current between said auxiliary brushes through the armature of said machine, said variator windings being connected in series with each other between the cross conductors which connect homologous auxiliary brushes of the several machines.

11. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by the flow of current between said auxiliary brushes through the armature of said machine, said variator winding being connected across the brushes of a pair of auxiliary brushes of the respective machines, and a constant flux producing winding associated with each dynamo electric machine and positioned with its magnetic axis in line with the magnetic axis of said variator winding which is associated with the respective machine and adapted to oppose the flux generated by said associated variator winding.

12. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by the flow of current between said auxiliary brushes through the armature of said machine, said variator winding being connected across the brushes of a pair of auxiliary brushes of the respective machines, and a constant flux producing winding associated with each dynamo electric machine and positioned with its magnetic axis in line with the respective machine and adapted to oppose the flux generated by said associated variator winding, said constant flux producing windings in the several machines being connected in series with each other and with the source of constant potential.

13. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by the flow of current between said auxiliary brushes through the armature of said machine, said variator windings being connected to the auxiliary brushes of an amplifier metadyne, said amplifier metadyne having a variator winding positioned with its magnetic axis substantially in line with the axis of the flux generated by flow of current between said auxiliary brushes of said amplifier metadyne through the armature thereof and connected between two groups of homologous brushes of said dynamo electric machines which in the respective groups are connected together by a cross conductor.

14. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by the flow of current between said auxiliary brushes through the armature of said machine, said variator windings being connected to the auxiliary brushes of an amplifier metadyne, said amplifier metadyne having a variator winding positioned with its magnetic axis substantially in line with the axis of the flux generated by flow of current between said auxiliary brushes of said amplifier metadyne through the armature thereof and connected between two groups of homologous brushes of said dynamo electric machines which in the respective groups are connected together by a cross conductor, said amplifier metadyne having a constant flux producing winding connected to a source of constant potential and positioned to produce a flux in line with and opposed to the flux produced by said variator winding of said amplifier metadyne.

15. In a direct current dynamo electric machine the combination as defined in claim 1, which comprises commutating windings in series with respective brushes of said machine.

16. In a direct current dynamo electric machine, the combination as defined in claim 1 which comprises a plurality of commutating windings connected in parallel between the primary brushes and the connector rings so as to be traversed by a part only of the current flowing in the terminal leads to which respective connector rings are connected.

17. In a direct current dynamo electric machine, the combination as defined in claim 1 which comprises a commutating winding associated with each primary brush and connected in series between said primary brush and the connector ring to which said primary brush is connected.

18. In a system for operation of a plurality of direct current dynamo electric machines connected in parallel, the combination as defined in claim 2 which comprises a variator winding associated with each dynamo electric machine and positioned with its effective magnetic axis substantially in line with the axis of the flux generated by flow of current between said auxiliary brushes through the armature of said machine, said variator windings being connected to the auxiliary brushes of an amplifier metadyne, said dynamo electric machines being operatively connected together to rotate in a constant speed relation to each other, a direct current generator operatively connected to said dynamo electric machine to rotate in a constant speed relation thereto, said amplifier metadyne having a variator winding positioned with its magnetic axis substantially in line with the axis of the flux generated by flow of the current between said auxiliary brushes thereof through the armature of said amplifier metadyne and connected to said direct current generator so as to be energized thereby, said direct current generator having an excitation winding connected across a source of constant potential difference whereby the flux generated by the variator winding of said amplifier metadyne varies with variations in the speed of said dynamo electric machines.

19. In direct current multicycle dynamo electric apparatus having armature means and commutating means cooperating therewith, a plurality of positive primary commutating brushes connected by a ring connector and connected to a positive exterior circuit terminal, and a plurality of negative primary commutating brushes connected by a ring connector and connected to a negative exterior circuit terminal, said primary brushes cooperating with said commutating means to establish unidirectional flow between said terminals of current flowing in said armature means, the combination therewith of a plurality of auxiliary brushes interplaced respectively between the positive primary brushes and the negative primary brushes and in electrical contact with said commutating means, and a plurality of cross conductors, each conductor connecting homologous auxiliary brushes only.

20. In direct current multicycle dynamo electric apparatus having armature means and commutating means cooperating therewith, means providing an excitation field for said armature, a plurality of positive primary commutating brushes positioned 90 electrical degrees from the magnetic axis of said excitation field and connected by a ring connector and connected to a positive exterior circuit terminal, a plurality of negative primary commutating brushes positioned 90 electrical degrees from the magnetic axis of said excitation field and connected by a ring connector and connected to a negative exterior circuit terminal, said primary brushes co-operating with said commutating means to establish unidirectional flow between said terminals of current flowing in said armature means, the combination therewith of a plurality of auxiliary brushes interplaced respectively between said positive primary brushes and said negative primary brushes substantially in line with the magnetic axis of said excitation field and in electrical contact with said commutating means, and a plurality of cross conductors, each conductor connecting homologous auxiliary brushes only.

21. In a multi-cycle dynamo electric machine having an armature rotatable on an axis and a commutator concentric with and rotatable with said armature, a plurality of positive primary commutating brushes positioned about said axis in contact with said commutator, said positive brushes being connected by a ring connector and being connected to a positive exterior circuit terminal, and a plurality of negative primary commutating brushes positioned in alternate arrangement about said axis with respect to said positive primary commutating brushes and in contact with said commutator, said negative brushes being connected by a ring connector and being connected to a negative exterior circuit terminal, the combination therewith of a plurality of auxiliary brushes interplaced respectively between said positive and negative primary brushes about and in contact with said commutator, and bus rings connecting each auxiliary brush to a homologous auxiliary brush only.

JOSEPH MAXIMUS PESTARINI.

REFERENCES CITED

The following references are of record in the file of this patent:

UNITED STATES PATENTS

| Number | Name | Date |
|---|---|---|
| 523,668 | Knight | July 31, 1894 |
| 1,317,877 | Klinkhamer | Oct. 7, 1919 |
| 2,183,396 | Greer | Dec. 12, 1939 |
| 2,227,678 | Stiles | Jan. 7, 1941 |
| 2,428,621 | Fisher | Oct. 7, 1947 |